United States Patent
Schilder et al.

(10) Patent No.: US 9,822,851 B2
(45) Date of Patent: Nov. 21, 2017

(54) MULTISTAGE TRANSMISSION FOR A MOTOR VEHICLE

(71) Applicant: Daimler AG, Stuttgart, DE (US)

(72) Inventors: Tobias Schilder, Stuttgart (DE); Klaus Riedl, Tuebingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 15/102,838

(22) PCT Filed: Nov. 4, 2014

(86) PCT No.: PCT/EP2014/002953
§ 371 (c)(1),
(2) Date: Jun. 8, 2016

(87) PCT Pub. No.: WO2015/086101
PCT Pub. Date: Jun. 18, 2015

(65) Prior Publication Data
US 2016/0312860 A1 Oct. 27, 2016

(30) Foreign Application Priority Data

Dec. 12, 2013 (DE) .......................... 10 2013 021 000

(51) Int. Cl.
*F16H 3/66* (2006.01)

(52) U.S. Cl.
CPC ....... *F16H 3/66* (2013.01); *F16H 2200/0078* (2013.01); *F16H 2200/0086* (2013.01); *F16H 2200/0091* (2013.01); *F16H 2200/2012* (2013.01); *F16H 2200/2048* (2013.01);
(Continued)

(58) Field of Classification Search
None
See application file for complete search history.

(56) References Cited

U.S. PATENT DOCUMENTS 8,425,370 B2 * 4/2013 Leesch ...................... F16H 3/66
475/271
8,784,259 B2 7/2014 Shim et al.
(Continued)

FOREIGN PATENT DOCUMENTS

DE 10 2008 055 626 A1 5/2010
DE 10 2011 056 787 A1 3/2013
(Continued)

OTHER PUBLICATIONS

PCT/EP2014/002953, International Search Report dated Mar. 25, 2015 (Three (3) pages).
(Continued)

*Primary Examiner* — Erin D Bishop
(74) *Attorney, Agent, or Firm* — Crowell & Moring LLP

(57) ABSTRACT

A multistage transmission, in particular for a motor vehicle, is provided at least structurally for selecting at least twelve forward transmission gears with different step-up ratios. This multistage transmission has four operatively interconnected planetary gear stages, a transmission input shaft for attaching to an internal combustion engine, a transmission output shaft, for attaching to drive wheels, four clutch units, each of which includes two clutch elements, and three brake units, each of which includes one clutch element.

9 Claims, 2 Drawing Sheets

(52) U.S. Cl.
CPC ............... *F16H 2200/2064* (2013.01); *F16H 2200/2094* (2013.01)

(56) References Cited

U.S. PATENT DOCUMENTS

2012/0196718 A1    8/2012  Hart et al.
2014/0179487 A1    6/2014  Thomas et al.

FOREIGN PATENT DOCUMENTS

DE    10 2013 114 446 A1    6/2014
WO    WO 2014/202211 A1    12/2014

OTHER PUBLICATIONS

"Das Neungang-Automatikgetriebe 9G-Tronic Von Mercedes-Benz", Jan. 31, 2014 (Jan. 31, 2014), XP055175590, English machine translation, URL:http://download.springer.com/static/pdf/181/art%3A10.1007%2Fs35148-014-0012-3.pdf?auth66=1426248756_78b6cdb924a4a3cedf89e91536aaa6ee&ext=.pdf, 6 pages.
Markus Jordan: "IAA 2013: 9G-Tronic feiert Weltpremiere | Merecdes-Benz Passion Blog", Sep. 11, 2013 (Sep. 11, 2013), XP055175318, English machine translation, URL:http://blog.mercedes-benz-passion.com/2013/09/iaa-2013-9g-tronic-feiert-weltpremiere/, 1 page.

\* cited by examiner

|     | S4 | S6 | S2 | S1 | S7 | S3 | S5 |
| --- | --- | --- | --- | --- | --- | --- | --- |
| V1  | ● | ● |   |   |   | ● |   |
| V1/2 |   | ● |   |   |   | ● | ● |
| V2  |   | ● |   | ● |   | ● |   |
| V2/3 |   | ● |   | ● |   |   | ● |
| V3  | ● | ● |   | ● |   |   |   |
| V4  | ● | ● |   |   | ● |   |   |
| V4' |   | ● |   | ● | ● |   |   |
| V4'' |   | ● | ● |   | ● |   |   |
| V4''' |   | ● |   |   | ● | ● |   |
| V4'''' |   | ● |   |   | ● |   | ● |
| V5  | ● |   |   | ● | ● |   |   |
| V6  |   |   |   | ● | ● | ● |   |
| V6' |   |   |   | ● | ● |   | ● |
| V6'' |   |   |   |   | ● | ● | ● |
| V6''' |   |   |   | ● |   | ● | ● |
| V7  | ● |   |   |   | ● | ● |   |
| V8  |   |   | ● |   | ● | ● |   |
| V9  | ● |   | ● |   | ● |   |   |
| V10 |   |   | ● |   | ● |   | ● |
| R1  |   | ● | ● |   |   |   | ● |
| R   | ● | ● | ● |   |   |   |   |
| R2  |   |   | ● |   |   | ● | ● |

Fig. 2

MULTISTAGE TRANSMISSION FOR A MOTOR VEHICLE

BACKGROUND AND SUMMARY OF THE INVENTION

The invention relates to a multistage transmission for a motor vehicle.

From DE 10 2008 055 626 A1 a multistage transmission for a motor vehicle, which is designed for selecting nine forward transmission gears, with different step-up ratios, is known. The multistage transmission of DE 10 2008 055 626 A1 comprises four operatively interconnected planetary gear stages, a transmission input shaft for attaching to an internal combustion engine, a transmission output shaft for attaching drive wheels, three clutch units, each of which comprises two clutch elements and three brake units, each of which comprises one clutch element.

The object of the invention is in particular to provide a compact multistage transmission providing high flexibility and high efficiency.

According to the invention, a multistage transmission, in particular for a motor vehicle, the transmission being provided at least structurally for selecting at least twelve forward transmission gears with different step-up ratios, with four operatively interconnected planetary gear stages, with a transmission input shaft for attaching to an internal combustion engine, with a transmission output shaft, for attaching to drive wheels, with four clutch units, each of which comprises two clutch elements, and with three brake units, each of which comprises one clutch element, is proposed.

By such a configuration of a multistage transmission, a compact multistage transmission with twelve forward transmission gears and three reverse transmission gears may be provided, which on the one hand has a very high flexibility and a high power-shifting capability and on the other hand a high efficiency. Rotation speed and torque factors of transmission elements of multistage transmission, in particular of planet gear carriers, may be reduced, at least in part by an embodiment of the invention, whereby the stresses on transmission elements may be reduced. Moreover, a low relative speed in at least one open clutch unit and/or in at least one open brake unit may be obtained. Due to the inventive configuration of the multistage transmission, at least one of the clutch units and/or at least one of the brake units may be provided with a form fitting switching, so that a multistage transmission with reduced drag losses may be provided. Furthermore, a particularly high spread, in particular greater than 11, can be achieved between the first forward gear and the last forward gear. Moreover, a hybrid functionality with one or two electric motors and/or a four-wheel drive functionality may be easily implemented.

A "clutch unit" should in particular be understood as a switching unit, which is arranged in a power flow between two of the planetary gear stages and which is provided to connect its two non-rotatably mounted clutch elements, which are independently rotatable in an open state, in a closed state, in a rotationally fixed relationship to each other. A "brake unit" should in particular be considered as a switching unit, which is operatively arranged between one of the planetary gear stages and a transmission housing, and which is provided to connect its rotatable clutch element, which, in an open state, may be rotated independently from the transmission housing, with transmission housing, in a closed state, in a non-rotatable way. By "rotationally fixed connection," a connection is to be understood, in particular wherein a power flow, averaged over a complete rotation, is transmitted with an unchanged torque, an unchanged direction of rotation and/or an unchanged speed.

The clutch units are preferably operatively arranged between the planetary gear stages, so that in the closed state at least two transmission elements of planetary gear stages are non non-rotatably fixed to each other. The brake units are respectively arranged operatively between one of the planetary gear stages and the transmission housing, so that, in the closed state, at least one transmission element of the planetary gear stage is non non-rotatably connected with the transmission housing. In this context, a clutch unit is not considered, in particular, a clutch unit, which is arranged before the first or after the fourth planetary gear stage. A "clutch unit which is arranged before the first planetary gear stage" in a particularly preferred embodiment, is a clutch unit, which in at least one transmission gear, is arranged in a power flow between the internal combustion motor and the transmission input shaft. A "clutch unit or brake unit, which is arranged after the fourth planetary gear stage," in a particularly preferred embodiment, is a clutch unit, or brake unit, which, in at least one transmission gear, is arranged in a power flow between the transmission output shaft and an axle drive, as for example, in a four-wheel clutch. Basically, the switching capability of the multistage transmission may be increased by a clutch unit, which is arranged in an upstream position with respect to the first planetary gear stage and/or by a clutch unit which is arranged in a downstream position with respect to the fourth planetary gear stage.

"Structurally provided for switching a transmission gear" means in particular that by means of the clutch units and brake units a corresponding transmission gear may be mechanically realized, in principle, irrespective of the fact that in the context of a switching strategy, the selection of the gear is omitted or not. "Provided" means in particular programmed, equipped, configured and/or arranged.

Since the multistage transmission comprises four clutch units and three brake units, the multistage transmission comprises a total of seven switching units. In an advantageous embodiment, at least one of the switching units, in particular at least two of the switching units, are provided with a form fit. Thereby, the drag loss may be minimized, whereby the power loss in the multistage transmission may be reduced. Preferably, one of the clutch units is a form-fitting switching unit. In particular, additionally or alternatively, at least one of the brake units is a form-fitting switching unit.

A "form-fitting switching unit" means, in particular, a switching unit, which is provided with a toothing and/or claws for connecting its clutch elements or for attaching its clutch element, wherein the toothing or claws form-fittingly engage for providing a rotationally fixed connection, wherein the transmission of a power flow in a completely closed state at least substantially take place by means of a form fit. The seen switching units may be substantially made by friction of form fit. A "frictionally engaged switching unit" is in particular a switching unit, which, for connecting its clutch elements or for attaching its clutch element, is provided with at least two friction partners, which, for providing a rotationally fixed connection, are frictionally contacting each other, wherein the transmission of a power flow in a completely closed state, takes place at least substantially by friction. A frictionally configured clutch unit is preferably a multi-plate clutch unit, and a frictionally configured brake unit is preferably a clawed brake unit. A formfitting switching unit is advantageously switchable by means of a sliding sleeve. A formfitting switching unit may be provided with or without a synchronization.

Preferably, the multistage transmission comprises actuators for the automatic connection of the clutch units and brake units. In principle, it is also possible, that at least a portion of the clutch units and/or the brake units are at least partially self-switching. An independent self-switching clutch unit and brake unit is in particular designed as a freewheel. It is also possible, in principle, to form at least one part of the clutch units and/or the brake units as each a combination of a frictional switching unit and an independent self-switching unit or as each a combination of a form-fitting switching unit and an independent self-switching unit.

The four planetary gear stages are preferably constructed as a first, a second, a third and a fourth planetary gear stage. Preferably, the planetary gear stages are arranged behind one another along a main axis of rotation. The numbering of the planetary gear stages as "first," "second," "third" and "fourth" represent, when viewed along an axial direction originating from the engine axial direction, in particular a sequence of an axial arrangement of planetary gear stages, wherein along the direction originating from the internal combustion engine, with respect to the other three planetary gear stages, the first planetary gear stage occupies a first, i.e. foremost axial position, the second planetary gear stage a second axial position following the first axial position, the third planetary gear stage a third axial position subsequent to the second axial position, and the third planetary gear stage a fourth axial position, subsequent to the third axial position, i.e. the rearmost axial position. Basically, however, a spatial rearrangement of the planetary gear stages, for example, in a stacked configuration, is also conceivable. A spatial rearrangement by a modified arrangement of clutch units and/or brake units or a modified arrangement of the intermediate shafts of the multistage transmission is also fundamentally possible.

For simplification, a "first, second, third or fourth planetary gear stage" has to be also construed as a first, second, third or fourth planet gear carrier associated with the first, second, third or fourth planetary gear stage, respectively. Correspondingly, a "first, second, third or fourth sun gear" and a "first, second, third or fourth ring gear" should be considered as a sun gear associated to the first, second, third or fourth planetary gear stage or a ring gear associated to the first, second, third or fourth planetary gear stage, respectively. For example, the first planet gear carrier has to be considered as a planet gear carrier of the first planetary gear stage.

Preferably, at least one of the clutch units is provided for blocking a planetary gear stage. "Blocking a planetary gear stage" means in particular that the sun gear, the planet gear carrier and the ring gear of a single planetary gear stage are rotationally fixed to each other, whereby in such an operating state, they have the same speed and the same direction of rotation. A "clutch unit, provided for blocking a planetary gear stage" is considered as a blocking clutch unit, by which by closing only this clutch unit, the corresponding planetary gear stage may be blocked. To this end, the blocking clutch unit may be selectively arranged between the sun gear and the planet gear carrier or between the sun gear and the ring gear or between the planet gear carrier and the ring gear, of a respective planetary gear stage.

The embodiment of a multistage transmission, which is described in the following, represents a particular example, which has, in principle, further kinematically equivalent examples. For example, in particular, the planetary gear stages, as shown in the following, may be single planet gear sets. A kinematic equivalent is also the case when at least one of the planetary gear stages is a double planet gear set, whereby, in order to have the same kinematic operation, only the gear ratio of the planetary gear stage has to be adjusted. Moreover, in principle, also a connection of a sun gear and a planet gear carrier or of a ring gear and of a planet gear carrier or of a sun gear with a ring gear may be swapped, without changing the kinematic of the multistage transmission.

The terms "axial" and "radial" are referred, in the following, in particular, to the main rotation axis of the multistage transmission, so that the expression "axial" indicated, in particular, a direction, which is parallel or coaxial to the main rotation axis. The expression "radial" also indicates a direction which is perpendicular to the main rotation axis.

Further advantages result from the following description of the figures. In the figures, an embodiment of the invention is shown. The figures, the figure description and the claims contain numerous features in combination. Those skilled in the art will consider the features expediently also individually and combine them into additional, meaningful combinations.

BRIEF DESCRIPTION OF THE DRAWINGS

FIG. 2 is a circuit diagram of the multistage transmission.

DETAILED DESCRIPTION OF THE DRAWINGS

Figure 1:
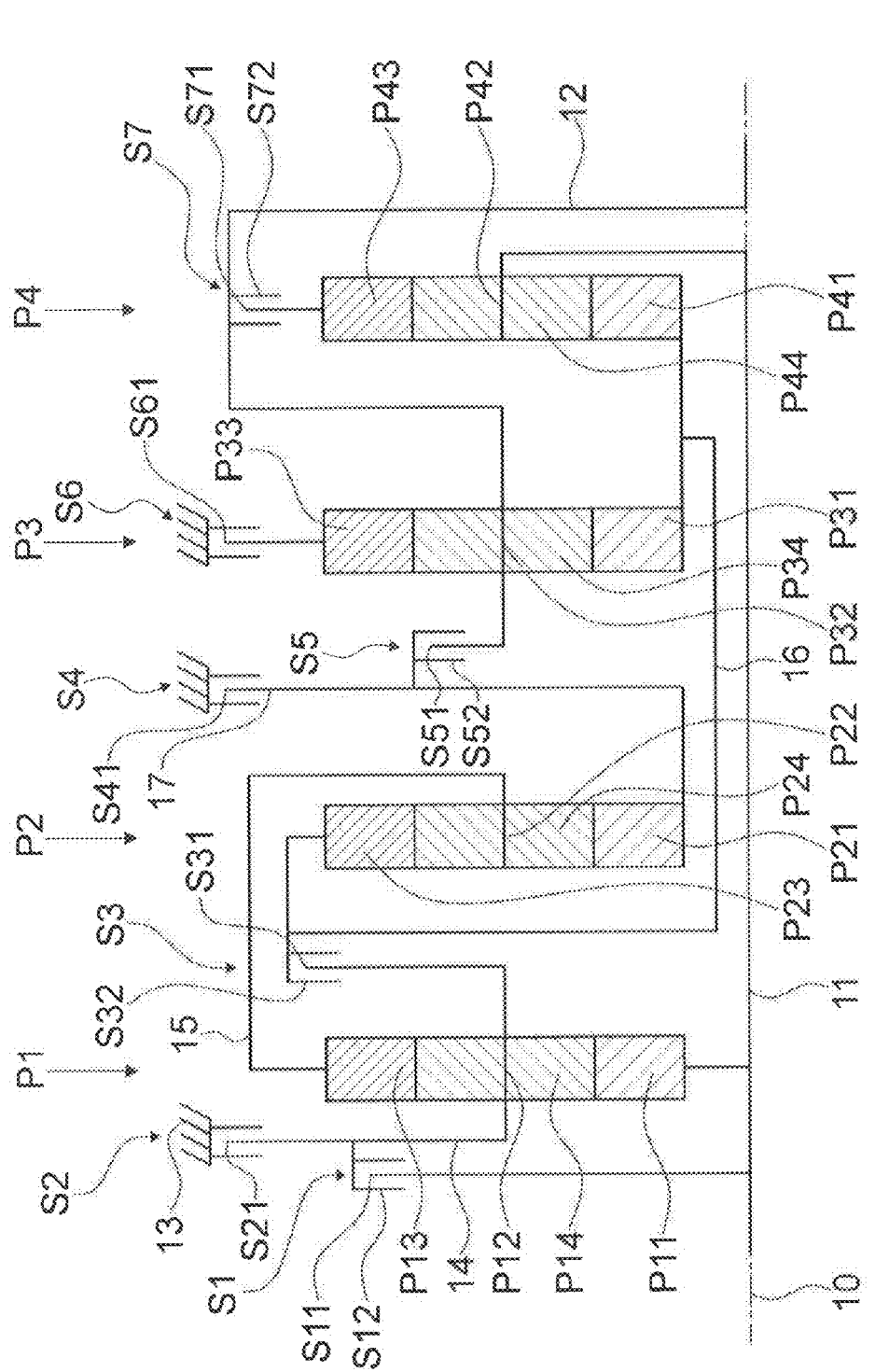
FIG. 1 is a transmission diagram of a multistage transmission according to the invention.

FIG. 1 shows a transmission diagram of a multistage transmission according to the invention in a motor vehicle. The multistage transmission is designed as a motor vehicle transmission. It has precisely four operatively interconnected planetary gear stages P1, P2, P3, P4. The first planetary gear stage P1, the second planetary gear stage P2, the third planetary gear stage P3, and the fourth planetary gear stage P4 are arranged in a row, in the illustrated embodiment, along a main axis of rotation 10. All four planetary gear stages P1, P2, P3, P4 of the multistage transmission have a single planet gear set.

The multistage transmission has exactly four clutch units S1, S3, S5, S7 and exactly three brake units S2, S4, S6, which are provided for selection of the planetary gear stages P1, P2, P3, P4. The four clutch units S1, S3, S5, S7 and the three brake units S2, S4, S6 are operatively arranged within a gear set by the planetary gear stage P1, P2, P3, P4. The four clutch units S1, S3, S5, S7 and the three brake units S2, S4, S6 are operatively integrated in the gear set by the planetary gear stage P1, P2, P3, P, i.e. the clutch units S1, S3, S5, S7 and the three brake units S2, S4, S6 are provided for providing different effective connections between the planetary gear stages P1, P2, P3, P4 with each other and/or with a gearbox 13.

The multistage transmission is constructively configured for switching twelve forward gears V1-V10, V1/2, V2/3 having different transmission ratios. Here, the two forward gears V1/2, V2/3 are configured as intermediate gears. The forward gear V1/2, configured as an intermediate gear, is arranged, with respect to the transmission ratio, between the first forward gear V1 and the second forward gear V2. The intermediate forward gear V2/3 is arranged, with respect to the transmission ratio, between the second forward gear V2 and the third forward gear V3. Further, the multistage transmission is constructively provided for switching to four alternative forward gears V4', V4", V4'", V4'" in addition to the fourth forward gear V4, which all have the same transmission ratio. In addition, the multistage transmission is constructively provided for switching to three alternative forward gears V6', V6", V6'" in addition to the sixth forward gear V6, all of which have the same transmission ratio. Due to the alternative forward gears V4', V4", V4'", V4"41 , V6', V6", V6'", the multistage transmission has a particularly high switching flexibility. In addition, the multistage transmission is construed for switching at least one reverse gear R, R1, R2. The multistage transmission is provided fix switching to three reverse gears R, R1 and R2 with different transmission ratios. The number of forward gears actually used V1-V10, V1/2, V2/3, of alternative forward gears V4', V4", V4'", V4"", V6', V6", V6'" and of reverse gears actually used R, R1, R2 can be limited by an operating strategy, for example, electronically through an adequately programmed control and adjusting unit.

The multistage transmission is provided for connecting an internal combustion engine of the motor vehicle, not shown, with a non-illustrated axle drive for driving wheels of the motor vehicle. By means of the multistage transmission, a transmission ratio can be adjusted between the engine and the final drive. The multistage transmission can be connected with provide a hybrid functionality with a hybrid drive module by means of which a drive torque can be changed. Moreover, by means of the hybrid drive module and the multistage transmission, a CVT can be provided, creating a multistage transmission whose gear ratio can be continuously adjusted at least in some fields. In particular, it is conceivable to integrate at least one electric motor in the gear stage to provide a hybrid drive module.

To connect the internal combustion engine, the multistage transmission has a transmission input shaft 11, which is intended to introduce a drive torque in the multistage transmission. The transmission input shaft 11 is connected or connectable, in a mounted state, in a non-rotatable way with a crankshaft of the internal combustion engine. Basically, the transmission input shaft 11 can have a damper located upstream. The transmission input shaft 11 may further include a not further illustrated module to be connected upstream, which should be provided in particular to provide a starting functionality. As an upstream module, for example, a converter or a wet starting clutch may be conceived. Basically, the module provided for starting may also be integrated in the multistage transmission.

For the connection to the drive wheels, the multistage transmission has a transmission output shaft 12, which is provided for outputting a driving torque from the multistage transmission. The transmission output shaft 12 is permanently non-rotatably connected with the axle drive of the motor vehicle. The transmission output shaft 12 may have different modules connected downstream, by means of which the drive torque output by the multistage transmission may be distributed to the drive wheels, such as a differential gear, provided for speed compensation between the drive wheels, or a four-wheel drive module provided for four-wheel drive functionality, which distributes the drive torque to two different drive axles. The transmission input shaft 11 and the transmission output shaft 12 can in principle be arranged in any way to each other. Here, a coaxial arrangement on opposite sides of the multistage transmission is particularly advantageous. However, an arrangement on the same side of the multistage transmission is also possible. For example, by a rearrangement of the planetary gear stages P1, P2, P3, P4, the multistage transmission is provided for a front-transverse installation, in which an output lies between the individual planetary gear stages P1, P2, P3, P3.

The first planetary gear stage P1 is arranged on the input side along the main axis of rotation 10. The first planetary gear stage P1 has a single planet gear set. The first planetary gear stage P1 comprises a first sun gear P11, a first ring gear P13 and a first planet gear carrier P12. The first planet gear carrier P12 leads first planetary gears P14 in a circular path. The first planetary gears P14 mesh with the first sun gear P11 and the first ring gear P13. The first planet gears P14 are non-rotatably mounted on the first planet gear carrier P12.

The second planetary gear stage P2 is centrally located on the input side along the main axis of rotation 10. It is located axially between the first planetary gear stage P1 and the third planetary gear stage P3. The second planetary gear stage P2 has a single planet gear set. The second planetary gear stage P2 includes a second sun gear P21, a second ring gear P23 and a second planet gear carrier P22. The second planet gear carrier P22 leads second planet gears P24 on a circular path. The second planet gears P24 mesh with the second sun gear P21 and the second ring gear P23. The second planet gears P24 are non-rotatably supported on the second planet gear carrier P22.

The third planetary gear stage P3 is centered on the output side along the main axis of rotation 10. It is located axially between the second planetary gear stage P2 and the fourth planetary gear stage P4. The third planetary gear stage P3 has a single planet gear set. The third planetary gear stage P3 includes a third sun gear P31, a third ring gear P33 and a third planet gear carrier P32. The third planet gear carrier P32 leads third planetary gears P34 in a circular path. The third planetary gears mesh with the third sun gear P34 P31 and with the third ring gear P33. The third planet gears P34 are non-rotatably mounted on the third planet gear carrier P32.

The fourth planetary gear stage P4 is arranged on the output side along the main axis of rotation 10. The fourth planetary gear stage P4 has a single planet gear set. The fourth planetary gear stage P4 comprises a fourth sun gear P41, a fourth ring gear P43 and a fourth planet gear carrier P42. The fourth planet gear carrier P42 leads fourth planetary gears P44 in a circular path. The fourth planet gears P44 mesh with the fourth sun gear P41 and with the fourth ring gear P43. The fourth planet gears P44 are non-rotatably mounted on the fourth planet gear carrier P42.

The four clutch units S1, S3, S5, S7 each have a first rotatable clutch element S11, S31, S51, S71, and a second rotatable clutch element S12, S32, S52, S72. The four clutch units S1, S3, S5, S7 are each intended to connect their two clutch elements S11, S12, S31, S32, S51, S52, S71, S72 together in a non-rotatable way. Both clutch elements S11, S12, S31, S32, S51, S52, S71, S72 of the respective clutch unit S1, S3, S5, S7 are permanently connected with at least one of the sun gears P1, P21, P31, P41, one of the planet gear carriers P12, P22, P32, P42 and/or one of the ring gears P13, P23, P33, P43.

The three brake units S2, S4, S6 each have only a non-rotatably mounted clutch element S21, S41, S61, which are respectively non-rotatably connected with the transmission housing 13. The three brake units S2, S4, S6 are each intended to firmly fix their rotatable clutch element S21, S41, S61 to the housing. The clutch element S21, S41, S61 of the respective braking units S2, S4, S6 is permanently connected with at least one of the sun gears P11, P21, P3, P41, one of the planet gear carrier P12, P22, P32, P42 and/or one of the ring gears P13, P23 P33, P43.

One of the four clutch units S1, S3, S5, S7 has a form-fitting construction. The remaining three of the four clutch units S1, S3, S5, S7 have a friction fitting configuration. In this embodiment, the clutch unit S5 has a form-fitting construction and the three clutch units S1, S3, S7 have a friction fitting configuration. The friction fitting clutch units S1, S3, S7 each have a not-shown clutch disc pack which is provided for providing the non non-rotatably, frictional connection between the two clutch elements S11, S12, S31, S32, S71, S72 of the corresponding clutch unit S1, S3, S7. The three frictional clutch units S1, S3, S7 are as multi-plate clutches. The form-fitting clutch unit S5 includes a not illustrated sliding sleeve which is provided for providing the rotationally fixed, form-fitting connection between the two clutch elements S51, S52. The form-fitting clutch unit S5 further includes a synchronizing unit, not shown, which in principle can also be omitted. The form-fitting clutch unit S5 is configured as a claw clutch.

Two of the three brake units S2, S4, S6 have a form-fitting configuration. The other of the three brake units S2, S4, S6 is of the friction fitting type. In this embodiment, the two brake units S2, S6 are form-fitting and the brake unit S4 is frictional. The frictional brake unit S4 has a not-shown clutch disc pack, which is provided for providing the rotationally fixed, frictional connection of the clutch element S41 with the transmission housing 13. The friction brake unit S4 is configured as a multi-disc brake. The form-fitting brake units S2, S6 each comprise a non-illustrated shift sleeve which is provided for providing the rotationally fixed, form-fitting connection between clutch element S21, S61 and the transmission housing 13. The form-fitting brake units S2, S6 further have each a synchronization unit, not shown, which can in principle be omitted. The two form-fitting brake units S2, S6 are claw clutches.

Through the form-fitting clutch unit S5, and the form-fitting brake units S2, S6, in the forward gear speeds V1, V3, V5, V6, V10, V11, only two of the frictional clutch units S1, S3, S7 and brake unit S4 are opened. In the alternative forward gears V6', V6''', V8', V8'', V8''' only two of the frictional clutch units S1, S3, S7 and brake unit S4 are also open. Through the form-fitting clutch unit S5, and the form-fitting brake units S2, S6, in the forward gears V7, V8, V9, even only one of the friction clutch units S1, S3, S7 or brake units S4 are open. Alternatively, the clutch units S5 and/or at least one of the brake units S2, S6 but also for example a clutch plate assembly may have a frictional configuration.

The clutch unit S1 and the brake unit S2 are arranged on the input side of the first planetary gear stage P1. The brake unit S2 is arranged axially between the clutch unit S1 and the first planetary gear stage P1. The clutch unit S3 is disposed axially between the first planetary gear stage P1 and the second planetary gear stage P2. The brake unit S4 is disposed axially between the second planetary gear stage P2 and the third planet gear stage P3. It is located axially between the second planetary gear stage P2 and the clutch unit S5. The clutch unit S5 is disposed axially between the second planetary gear stage P2 and the third planet gear carrier P3. It is located axially between the brake unit S4 and the third planetary gear stage P3. The brake unit S6 is axially arranged at the level of the third planetary gear stage P3. The clutch unit S7 is located axially at the level of the fourth planetary gear stage P4. The clutch units S1, S5 and the braking units S2, S4, S6 are arranged outwards, i.e. an actuating medium supply of the clutch units S1, S5 and the braking units S2, S4, S6 is performed without leading an actuating means through a non-rotatably mounted gear element. The clutch units S3, S7 are arranged internally, that is, the supply of the actuating means to the clutch units S3, S7 is implemented by conducting the actuating means through a non-rotatably mounted gear element. The clutch units S1, S3, S5, S7 and the brake units S2, S4, S6 are hydraulically actuated.

The transmission input shaft 11 is permanently rotationally connected with the first sun gear P11, the first clutch element S11 of the clutch unit S1 and the fourth planet gear carrier P42. The transmission output shaft 12 is permanently non-rotatably connected with the third planet gear carrier P32, to the second clutch element S72 of the clutch unit S7 and to the first clutch element S51 of the clutch unit S5.

For connecting the planetary gear stages P1, P2, P3, P4, the multistage transmission comprises four intermediate shafts 14, 15, 16, 17. The intermediate shafts 14, 15, 16, 17 are for transmitting a power flow between the planetary gear stages P1, P2, P3, P4. They are each permanent non-rotatably connected with at least two of the sun gears P11, P21, P31, P41, planet gear carriers P12, P22, P32, P42, ring gears P13, P23, P33, P43 and/or the clutch elements S12, S21, S31, S32, S41, S52.

The transmission input shaft 11 passes through the four planetary gear stages P1, P2, P3, P4. The transmission input shaft 11 connects the first sun gear P11 and the fourth planet gear carrier P42 permanently in a non-rotatably way to the first clutch element S11 of the clutch unit S1. To connect the fourth planet gear carrier P42, the gear input shaft 11 is led radially outwards on the output side of the fourth planetary gear stage P4. It is radially led to the outside for connection of the fourth planet gear carrier P42 axially between the fourth planetary gear stage P4 and the transmission output shaft 12. To connect the first clutch element S11 of the clutch unit S1, the transmission input shaft 11 is directed radially outward on the input side of the first planetary gear stage P1. The transmission input shaft 11 is axially connected at the level of the first sun gear P11 radially inward to the first sun gear P11. The transmission input shaft 11 limits the multistage transmission on the input side.

The transmission output shaft 12 connects the third planet gear carrier P32 permanently in a non-rotatably way to the second clutch element S72 of the clutch unit S7 and the first clutch element S51 of the clutch unit S5. It is then guided radially outwardly and axially inwardly on the output side of the fourth planetary gear stage P4 for connecting the second clutch element S72 of the clutch unit S7. To connect the third planet gear carrier P32, the transmission output shaft 12 is led on the output side of the fourth planetary gear stage P4 radially outward, then guided axially inwardly and finally axially between the third planetary gear stage P3, and the fourth planetary gear stage P4. The transmission output shaft 12 surrounds the fourth planetary gear stage P4. It partially surrounds the transmission input shaft 11 and partially the third intermediate shaft 16. In order to connect the first clutch element S51 of the clutch unit S5, the transmission output shaft 12 is guided axially radially outward between the second planetary gear stage P2 and the third planet gear carrier P3. To permanently non-rotatably connect the first clutch element S51 of the clutch unit S5 and the second clutch element S72 of the clutch unit S7 to each other, the transmission output shaft 12 passes through the third planet gear carrier P32. The transmission output shaft 12 limits the multistage transmission on the output side.

The first intermediate shaft 14 connects the second clutch element S12 of the clutch unit S1, the clutch element S21 of the brake unit S2 and the first clutch element S31 of the clutch unit S3 permanently in a rotationally fixed way to each other. It connects the second clutch element S12 of the clutch unit S1, the clutch element S21 of the brake unit S2 and the first clutch element S31 of the clutch unit S3 permanently non-rotatably to the first planet gear carrier P12. For the connection of the clutch element S21 of the brake unit S2, the first intermediate shaft 14 is guided axially radially outward between the clutch unit S1 and the first planetary gear stage P1. To connect the first clutch element S31 of the clutch unit S3, the first intermediate shaft 14 is guided axially radially outward between the first planetary gear stage P1 and the second planetary gear stage P2. To permanently non-rotatably connect the second clutch element S21 of the clutch unit S1, the clutch element S21 of the brake unit S2 and the first clutch element S31 of the clutch unit S3 together, the first intermediate shaft 14 passes through the first planet gear carrier P12.

The second intermediate shaft 15 connects the first ring gear P13 and the second planet gear carrier P22 permanently in a rotationally fixed way to each other. The second intermediate shaft 15 surrounds the second planetary gear stage P2. It is externally connected radially to the first ring gear P13. To connect the second gear carrier P22, the second intermediate shaft 15 is guided axially radially inward between the second planetary gear stage P2 and the third planet gear carrier P3. It is guided radially inward to connect the second gear carrier P22 axially between the second planetary gear stage P2 and the fourth intermediate shaft 17. The second intermediate shaft 15 surrounds the clutch unit S3.

The third intermediate shaft 16 connects the second ring gear P23, the third sun gear P31 and the fourth sun gear P41 permanently in a rotationally fixed way to the second clutch element S32 of the clutch unit S3. For connection to the third sun gear P31 and the fourth sun gear P41 the third intermediate shaft 16 passes through the second planetary gear stage P2. To connect the second ring gear P23 and the second clutch element S32 of the clutch unit S3, the third intermediate shaft 16 is guided radially outwards axially between the first planetary gear stage P1 and the second planetary gear stage P2. The third intermediate shaft 16 axially partially surrounds the transmission input shaft 11. The third intermediate shaft 16 is connected axially on the outside to the second ring gear P23.

The fourth intermediate shaft 17 connects the second sun gear P21 permanently non-rotatably to the clutch element S41 of the brake unit S4 and the second clutch element S52 of the clutch unit S5. To connect the clutch elements S41, S52, the fourth intermediate shaft 17 is guided axially radially outward between the second planetary gear stage P2 and the third planet gear carrier P3.

The third ring gear P33 is permanently non-rotatably connected with the clutch element S61 of the brake unit S6. For the rotationally fixed connection of the third ring gear P33 to the transmission housing 13, the clutch element S61 of the brake unit S6 is connected axially outwards to the third ring gear P33 and is guided radially outwards.

The fourth ring gear P43 is permanently non-rotatably connected with the first clutch element S71 of the clutch unit S7. For a fixed connection of the fourth ring gear P43 with the transmission output shaft 12, the first clutch element S71 of the clutch unit S7 is connected axially and on the outside to the fourth ring gear P43 and is radially guided outwards.

The clutch unit S1 is provided for non-rotatably connecting to each other the first clutch element S11 connected with the first sun gear P11 and the second clutch element S12 non-rotatably connected with the first planet gear carrier P12. The clutch unit S1 is thus particularly adapted to connect the transmission input shaft 1 in a non-rotatable way to the first planet gear carrier P12. In addition, the clutch unit S1 is thus particularly adapted to block the first planetary gear stage P1. The clutch assembly S1 is closed in the forward gears V2, V2/3, V3, V4''', V5, V6, V6', V6''' (see FIG. FIG. 2).

The brake unit S2 is provided for connecting the clutch element S21 non-rotatably connected with the first planet gear carrier P12 with the housing, and therefore to connect it non-rotatably to the transmission housing 13. The brake unit S2 is thus particularly adapted to connect the first planet gear carrier P12 non-rotatably to the transmission housing 13. The brake unit S2 is closed in the forward gears V4'', V8, V9, V10 and in the reverse transmission gears R, R1, R2.

The clutch unit S3 is provided to connect to each other in a non-rotatable way the first clutch element S31 non-rotatably connected with the first planet gear carrier P12 and the second clutch element S32 non-rotatably connected with the second ring gear P23, the third sun gear P31 and the fourth sun gear P41. The clutch unit S3 is thus particularly adapted to connect the first planet gear carrier P12 non-rotatably with the second ring gear P23, the third sun gear P31 and the fourth sun gear P41. The clutch unit S3 is closed in the forward gears V1, V1/2, V2, V4''', V6, V6'', V6''', V7, V8, and in the reverse gear R2.

The brake unit S4 is provided for connecting the clutch element S41 non-rotatably connected with the second sun gear P21 with the housing and thus to rotationally fix it to the transmission housing 13. The brake unit S4 is thus particularly intended to non-rotatably connect the second sun gear P21 to the transmission housing 13. The brake unit S4 is closed in the forward gears V1, V3, V4, V5, V7, V9, and in the reverse gear R.

The clutch unit S5 is provided to non-rotationally connect the second clutch element S52 non-rotatably connected with the second sun gear P21 and the first clutch element S51 non-rotatably connected with the third planet gear carrier P32 to each other. The clutch unit S5 is thus particularly intended for non-rotatably connecting the second sun gear P21 to the third planet gear carrier P32. It is thus particularly provided for connecting the second sun gear P21 in a non-rotatable way to the transmission output shaft 12. The clutch unit S5 is closed in the forward gears V1/2, V2/3, V4'''', V6', V6'', V6''', V10 and in the reverse gears R1, R2.

The brake unit S6 is intended to connect the clutch element S61 non-rotatably fixed to third ring gear P33 with the housing and thus to connect it rotationally fixed to the transmission housing 13. The brake unit S6 is therefore particularly intended to connect the third ring gear P33 non-rotatably to the transmission housing 13. The brake unit S6 is closed in the forward gears V1, V1/2, V2, V2/3, V3, V4, V4', V4'', V4''', V4'''', V6', V6'', V6''', V10 and in the reverse transmission gears R, R1.

The clutch unit S7 is provided for non-rotatably connecting the second clutch element S72 non-rotatably connected with the third planet gear carrier P32 and the first clutch element S71 non-rotatably connected with the fourth ring gear P43 to each other. The clutch unit S7 is thus particularly adapted to connect the fourth ring gear P43 non-rotatably with the transmission output shaft 12. It is intended to connect the fourth ring gear P43 non-rotatably to the third planet gear carrier P32. The clutch unit S7 is closed in the forward gears V4, V4', V4'', V4''',V4'''', V5, V6, V6', V6'', V7, V8, V9, V10.

FIG. 2 shows a schematic diagram of the multistage transmission. The forward transmission gears V1-V10, V1/2, V2/3 and reverse gears R, R1, R2 S7 are automatically switched by means of clutch units S1, S3, S5 and brake units S2, S4, S6. In the forward gears V1-V10, V1/2, V2/3 described in the following, a maximum of three of the clutch units S1, S3, S5, S7 and the brake units S2, S4, S6 are closed in total, while the remaining clutch units S1, S3, S5, S7 and brake units S2, S4, S6 are opened. In case of a gear shift from one of the forward gears V1-V10, V1/2, V2/3 in an adjacent forward gear V1-V10, V1/2, V2/3, exactly one of the clutch units S1, S3, S5, S7 or exactly one the brake units S2, S4, S6 is opened, while just one of the other clutch units S1, S3, S5, S7 or exactly one of the other braking units S2, S4, S6 is closed. In each switching operation from one of the forward gears V1-V10, V1/2, V2/3 into an adjacent forward gear V1-V10, V1/2, V2/3, two already closed clutch units S1, S3, S5, S7 or brake units S2, S4, S6 remain closed.

The first forward gear V1 is formed by the clutch unit S3, the brake unit S4 and the brake unit S6 being closed. The clutch unit S3 connects the first planet gear carrier P12 non-rotatably to the second ring gear P23, the third sun gear P31 and the fourth sun gear P41. The brake unit S4 connects the second sun gear P21 rotationally fixed to the transmission housing 13. The brake unit S6 connects the third ring gear P33 rotationally fixed to the transmission housing 13.

The forward gear V1/2 as an intermediate gear is formed by the clutch unit S3, the clutch unit S5 and the brake unit S6 being closed. The clutch unit S3 connects the first planet gear carrier P12 non-rotatably to the second ring gear P23, the third sun gear P31 and the fourth sun gear P41. The clutch unit S5 connects the second sun gear P21 non-rotatably to the third planet gear carrier P32. It connects the second sun gear P21 non-rotatably to the transmission output shaft 12. The brake unit S6 connects the third ring gear P33 rotationally fixed to the transmission housing 13.

The second forward gear V2 is formed by the clutch unit S1, the clutch unit S3 and the brake unit S6 being closed. The clutch unit S1 connects the transmission input shaft 11 non-rotatably to the first planet gear carrier P12. The clutch unit S3 connects the first planet gear carrier P12 non-rotatably to the second ring gear P23, the third sun gear P31 and the fourth sun gear P41. The brake unit S6 connects the third ring gear P33 rotationally fixed to the transmission housing 13.

The forward gear V2/3 as an intermediate gear is formed by the clutch unit S1, the clutch unit S5 and the brake unit S6 being closed. The clutch unit S1 connects the transmission input shaft 11 non-rotatably to the first planet gear carrier P12. The clutch unit S5 connects the second sun gear P21 non-rotatably to the third planet gear carrier P32. It connects the second sun gear P21 non-rotatably to the transmission output shaft 12. The brake unit S6 connects the third ring gear P33 rotationally fixed to the transmission housing 13.

The third forward gear V3 is formed by the clutch unit S1, the brake unit S4 and the brake unit S6 being closed. The clutch unit S1 connects the transmission input shaft 11 non-rotatably to the first planet gear carrier P12. The brake unit S4 connects the second sun gear P21 rotationally fixed to the transmission housing 3. The brake unit S6 connects the third ring gear P33 rotationally fixed to the transmission housing 13.

The fourth forward gear V4 is formed by the brake unit S4, the brake unit S6 and the clutch unit S7 being closed. The brake unit S4 connects the second sun gear P21 rotationally fixed to the transmission housing 13. The brake unit S6 connects the third ring gear P33 rotationally fixed to the transmission housing 13. The clutch unit S7 connects the fourth ring gear P43 non-rotatably to the transmission output shaft 12. It connects the fourth ring gear P43 non-rotatably to the third planet gear carrier P32.

The alternative forward gear V4' is formed by the clutch unit S1, the brake unit S6 and clutch unit S7 being closed. The alternative forward gear V4" is formed by the brake unit S2, the brake unit S6 and the clutch unit S7 being closed. The alternative forward gear V4'" is formed by the clutch unit S3, the brake unit S6 and the clutch unit S7 being closed. The alternative forward gear V4"" is formed by the clutch unit S5, the brake unit S6 and the clutch unit S7 being closed.

The fifth forward gear V5 is formed by the clutch unit S1, the brake unit S4 and the clutch unit S7 being closed. The clutch unit S1 connects the transmission input shaft 11 non-rotatably to the first planet gear carrier P12. The brake unit S4 connects the second sun gear P21 rotationally fixed to the transmission housing 13. The clutch unit S7 connects the fourth ring gear P43 non-rotatably to the transmission output shaft 12. It connects the fourth ring gear P43 non-rotatably to the third planet gear carrier P32.

The sixth forward gear V6 is designed as a direct gear. The sixth forward gear V6 is formed by the clutch unit S1, the clutch unit S3 and the clutch unit S7 being closed. The clutch unit S1 connects the transmission input shaft 11 non-rotatably to the first planet gear carrier P12. The clutch unit S3 connects the first planet gear carrier P12 non-rotatably to the second ring gear P23, the third sun gear P31 and the fourth sun gear P41. The clutch unit S7 connects the fourth ring gear P43 non-rotatably to the transmission output shaft 12. It connects the fourth ring gear P43 non-rotatably to the third planet gear carrier P32.

The alternative forward gear V6' is formed by the clutch unit S1, the clutch unit S5 and clutch unit S7 being closed. The alternative forward gear V6" is formed by the clutch unit S3, the clutch unit S5 and the clutch unit S7 being closed. The alternative forward gear V6'" is formed by the clutch unit S1, the clutch unit S3 and the clutch unit S5 being closed.

The seventh forward gear V7 is formed by the clutch unit S3, the brake unit S4 and the clutch unit S7 being closed. The clutch unit S3 connects the first planet gear carrier P2 non-rotatably to the second ring gear P23, the third sun gear P31 and the fourth sun gear P41. The brake unit S4 connects the second sun gear P21 rotationally fixed to the transmission housing 13. The clutch unit S7 connects the fourth ring gear P43 non-rotatably to the transmission output shaft 12. It connects the fourth ring gear P43 non-rotatably to the third planet gear carrier P32.

The eighth forward gear V8 is formed by the brake unit S2, the clutch unit S3 and the clutch unit S7 being closed. The brake unit S2 connects the first planet gear carrier P12 rotationally fixed to the transmission housing 13. The clutch unit S3 connects the first planet gear carrier P12 non-rotatably to the second ring gear P23, the third sun gear P31 and the fourth sun gear P41. The clutch unit S7 connects the fourth ring gear P43 non-rotatably to the transmission output shaft 12. It combines the fourth ring gear P43 non-rotatably to the third planet gear carrier P32.

The ninth forward gear V9 is formed by the brake unit S2, the brake unit S4 and the clutch unit S7 being closed. The brake unit S2 connects the first planet gear carrier P12 rotationally fixed to the transmission housing 13. The brake unit S4 connects the second sun gear P21 rotationally fixed to the transmission housing 13. The clutch unit S7 connects the fourth ring gear P43 non-rotatably to the transmission output shaft 12. It connects the fourth ring gear P43 non-rotatably to the third planet gear carrier P32.

The tenth forward gear V10 is formed by the brake unit S2, the clutch unit S5 and clutch unit S7 being closed. The brake unit S2 connects the first planet gear carrier P12 rotationally fixed to the transmission housing 13. The clutch unit S5 connects the second sun gear P21 non-rotatably to the third planet gear carrier P32. It connects the second sun gear P21 non-rotatably to the transmission output shaft 2. The clutch unit S7 connects the fourth ring gear P43 non-rotatably to the transmission output shaft 12. It connects the fourth ring gear P43 non-rotatably to the third planet gear carrier P32.

The reverse gear R is formed by the brake unit S2, the brake unit S4 and the brake unit S6 being closed. The brake unit S2 connects the first planet gear carrier P12 rotationally fixed to the transmission housing 13. The brake unit S4 connects the second sun gear P21 rotationally fixed to the transmission housing 13. The brake unit S6 connects the third ring gear P33 rotationally fixed to the transmission housing 13.

The multistage transmission is provided for forming the two further reverse gears R1, R2, in addition to the reverse gear R. The reverse gear R1 is formed by the brake unit S2, the clutch unit S5 and the brake unit S6 being closed. The reverse gear R2 is formed by the brake unit S2, the clutch unit S3 and the clutch unit S5 being closed.

A selection of the forward gears V1-V10, V1/2, V2/3 under load is in particular always possible if a power flux is passed by exactly one of the clutch units S1, S3, S5, S7 or the brake units S2, S4, S6, to exactly one other of the clutch units S1, S3, S5, S7 or the brake units S2, S4, S6, or when a switch state of only one of the clutch units S1, S3, S5, S7 or the brake units S2, S4, S6 is changed. The power-shift capacity of the forward gears V1-V10, V1/2, V2/3 and reverse gears R, R1, R2 results in particular from the circuit diagram shown in FIG. 2.

LIST OF REFERENCE NUMBERS

| | |
|---|---|
| 10 | main rotation axis |
| 11 | transmission input shaft |
| 12 | transmission output shaft |
| 13 | gearbox |
| 14 | intermediate shaft |
| 15 | intermediate shaft |
| 16 | intermediate shaft |
| 17 | intermediate shaft |
| P1 | first planetary gear stage |
| P11 | first sun gear |
| P12 | first planet gear |
| P13 | first ring gear |
| P14 | first planet gear |
| P2 | second planetary gear stage |
| P21 | second sun gear |
| P22 | second planet gear |
| P23 | second ring gear |
| P24 | second planet gear |
| P3 | third planetary gear stage |
| P31 | third sun gear |
| P32 | third planet gear |
| P33 | third ring gear |
| P34 | third planet gear |
| P4 | fourth planetary gear stage |
| P41 | fourth sun gear |
| P42 | fourth planet gear |
| P43 | fourth ring gear |
| P44 | fourth planet gear |
| S1 | clutch unit |
| S11 | first coupling member |
| S12 | second coupling member |
| S2 | brake unit |
| S21 | clutch element |
| S3 | clutch unit |

-continued

LIST OF REFERENCE NUMBERS

| | |
|---|---|
| S31 | first coupling member |
| S32 | second coupling member |
| S4 | brake unit |
| S41 | clutch element |
| S5 | clutch unit |
| S51 | first coupling member |
| S52 | second coupling member |
| S6 | brake unit |
| S61 | clutch element |
| S7 | clutch unit |
| S71 | first coupling member |
| S72 | second coupling member |
| V1-V10, V1/2, V2/3 | forward gear |
| V4'-V4'''' | alternative forward gear |
| V6'-V6''' | alternative forward gear |
| R | Reverse gear |
| R1 | reverse gear |
| R2 | reverse gear |

The invention claimed is:

1. A multistage transmission, comprising:
a transmission input shaft for attaching to an internal combustion engine, a transmission output shaft for attaching to drive wheels, four clutch units, each of which comprises two clutch elements, and three brake units, each of which comprises one clutch element;
wherein a first sun gear and a fourth planet gear carrier are permanently and non-rotatably connected with one of the clutch elements and to the transmission input shaft;
wherein a second ring gear, a third sun gear and a fourth sun gear are permanently and non-rotatably connected with one of the clutch elements;
wherein a first planet gear carrier is permanently and non-rotatably connected with three of the clutch elements;
wherein a second sun gear is permanently and non-rotatably connected with two of the clutch elements;
and wherein a third planet gear carrier is permanently and non-rotatably connected with two of the clutch elements and to the transmission output shaft;
wherein one of the clutch units is provided for non-rotatably connecting to each other one of the clutch elements non-rotatably connected with the second sun gear and one of the clutch elements which is non-rotatably connected with the third planet gear carrier, so that a selection of at least twelve forward transmission gears with different step-up ratios is structurally provided.

2. The multistage transmission according to claim 1, wherein a first ring gear and a second planet gear carrier are permanently and non-rotatably connected to each other.

3. The multistage transmission according to claim 1, wherein a third ring gear is permanently and non-rotatably connected with one of the clutch elements and wherein one of the brake units is provided for attaching the clutch element, which is non-rotatably connected with the third ring gear, to a housing.

4. The multistage transmission according to claim 1, wherein a fourth ring gear is permanently and non-rotatably connected with one of the clutch elements.

5. The multistage transmission according to claim 4, wherein one of the clutch units is provided for non-rotatably connecting to each other one of the clutch elements non-rotatably connected with the third planet gear carrier and the clutch element non-rotatably connected with the fourth ring gear.

6. The multistage transmission according to claim 1, wherein one of the clutch units is provided for non-rotatably connecting to each other the clutch element non-rotatably connected with the first sun gear and one of the clutch elements non-rotatably connected with the first planet gear carrier.

7. The multistage transmission according to claim 1, wherein one of the brake units is provided for fastening one of the clutch elements non-rotatably connected with the first planet gear carrier to a housing.

8. The multistage transmission according to claim 1, wherein one of the clutch units is provided for non-rotatably connecting to each other one of the clutch elements non-rotatably connected with the first planet gear carrier and the clutch element non-rotatably connected with the second ring gear, the third sun gear and the fourth sun gear.

9. The multistage transmission according to claim 1, wherein one of the brake units is provided for fixing one of the clutch elements, which is non-rotatably connected with the second sun gear, to the housing.

* * * * *